United States Patent [19]

Clark

[11] 4,175,483
[45] Nov. 27, 1979

[54] DONUT MAKER APPLIANCE WITH IMPROVED MEANS FOR COATING BATTER WITH COOKING OIL

[75] Inventor: Robert H. Clark, Columbia, Mo.

[73] Assignee: McGraw-Edison Company, Elgin, Ill.

[21] Appl. No.: 907,045

[22] Filed: May 18, 1978

[51] Int. Cl.² .............................................. A21B 5/08
[52] U.S. Cl. ...................................... 99/354; 99/374; 99/442; 426/307; 426/439
[58] Field of Search ................. 99/354, 442, 374, 372, 99/376, 345, 382; 426/307, 438, 439, 440

[56] References Cited

U.S. PATENT DOCUMENTS

| | | | |
|---|---|---|---|
| 1,966,411 | 7/1934 | Kaufmann | 99/382 |
| 3,236,196 | 2/1966 | Ibex | 99/372 |

*Primary Examiner*—George F. Mautz
*Attorney, Agent, or Firm*—Ronald J. LaPorte; Bruce R. Mansfield; Jon C. Gealow

[57] ABSTRACT

A donut making appliance includes upper and lower electrically heated grids movable into and out of mating engagement along first surfaces. Each of the first surfaces of the grids includes a predeterminedly placed annular recess having a central core. Upon bringing the grids into engagement, the recesses are aligned to define a toroidally shaped cavity in which cake or the like batter is placed for baking donut shaped cakes. The central core of the lower grid defines a well preferably having the shape of a truncated cone, open at the first surface of the grid. The central core of the upper grid comprises a plunger having a shape complementary to that of the well and extending outwardly from the first surface of the grid, for receipt in the well upon engagement of the grids. The plunger-well arrangement ensures the alignment of the recesses and the displacement of cooking oil deposited in the well upon bringing the grids into engagement. The cooking oil is displaced from the well upon receipt of the plunger therein, thereby covering the cake batter with oil to produce a finished crust on the donuts upon baking.

4 Claims, 3 Drawing Figures

DONUT MAKER APPLIANCE WITH IMPROVED MEANS FOR COATING BATTER WITH COOKING OIL

BACKGROUND OF THE INVENTION

This invention relates to electrical cooking appliances and more particularly to such appliances for baking toroidal or donut shaped cakes.

Electrical cooking appliances for baking donuts and the like cakes are well known in the art, see for example, U.S. Pat. Nos. 1,718,260; 1,966,411; and 4,066,797. Such appliances conventionally include mating upper and lower heated grids each having at least one annular, concave recess or form defined therein. Cake batter or dough is placed in the lower recess and the upper grid is lowered to bake the donuts. The mating forms or recesses define an enclosed toroidal cooking chamber or cavity which contains the batter as it is baked and shapes the baked batter into a toroidal or donut shaped cake.

In the donut baking appliances of the prior art, the central portion or core of the annular concave recesses are structured in a variety of ways. In the appliances of U.S. Pat. Nos. 1,718,260 and 4,066,797, the cores are merely raised, central, flat mating surfaces, while in U.S. Pat. No. 1,966,411, the central cores of the annular recesses of the upper grid include cavitities in which mating projections formed at the central core of the annular recesses of the lower grid are received for the purpose of aligning the upper and lower recesses and grids.

Of the prior art donut making appliances shown in the aforementioned patents, only the device of U.S. Pat. No. 4,066,797 includes provision for adding cooking oil to the dough or batter so that the resulting donuts have a finished crust. In the device of U.S. Pat. No. 4,066,797, an additional cavity is provided in the outer or top wall of the upper grid. Small apertures connect the cavity with the upper annular recess. Subsequent to the lowering of the upper grid, after batter has been placed into the lower annular recess, cooking oil is poured into the recess. The oil flows through the apertures into the upper annular recess and over the cake batter, coating the batter.

While the last mentioned arrangement for adding cooking oil to the donut forms appears to be workable, a quantity of heated cooking oil may remain in the exposed cavity in the upper grid where it can be spilled if the appliance should inadvertently be moved and the oil receiving cavity provides still another area of the device which requires cleaning after the cooking process has been completed.

SUMMARY OF THE INVENTION

Accordingly, it is a primary object of the present invention to provide a new and improved donut making or the like appliance similar to those described in the prior art, but in which cooking oil can be added thereto in a simple, yet effective manner, while avoiding the drawbacks of the prior art appliances.

It is a further object of the present invention to provide a new and improved donut making appliance of the last mentioned type in which the structure provided for adding cooking oil to the donut batter serves also to align the recesses of the upper and lower grids.

Briefly, a preferred embodiment of the donut making appliance according to the invention includes upper and lower heated grids, the upper grid being hingedly attached to the lower grid along first edges thereof and pivotal into and out of mating engagement with the lower grid. Each of the grids defines a plurality of annular, concave recesses for shaping batter supplied thereto, during the baking process. The forms or recesses of the upper grid are disposed for cooperation with those of the lower grid to define donut-shaped cooking chambers upon movement of the upper grid into engagement with the lower grid. The central cores of the recesses of the lower grid define cavities or wells which are widest at the upper open end thereof and are tapered downwardly toward the base of the wells. The central cores of the recesses or forms of the upper grid define plungers which are complementarily shaped to and are received in the lower wells upon moving the upper grid into engagement with the lower grid of the appliance.

In operation, either before or subsequent to the filling of the lower grid forms with batter, the lower wells are filled with cooking oil. When the batter has been placed in the lower grid forms, the upper grid is pivoted into engagement with the lower grid so that plungers are received in the oil filled wells, causing the oil to be displaced and to flow over the batter, covering the outer surface thereof, thereby providing the necessary cooking oil coating to produce a finished donut crust.

DETAILED DESCRIPTION OF THE DRAWING

Figure 1:
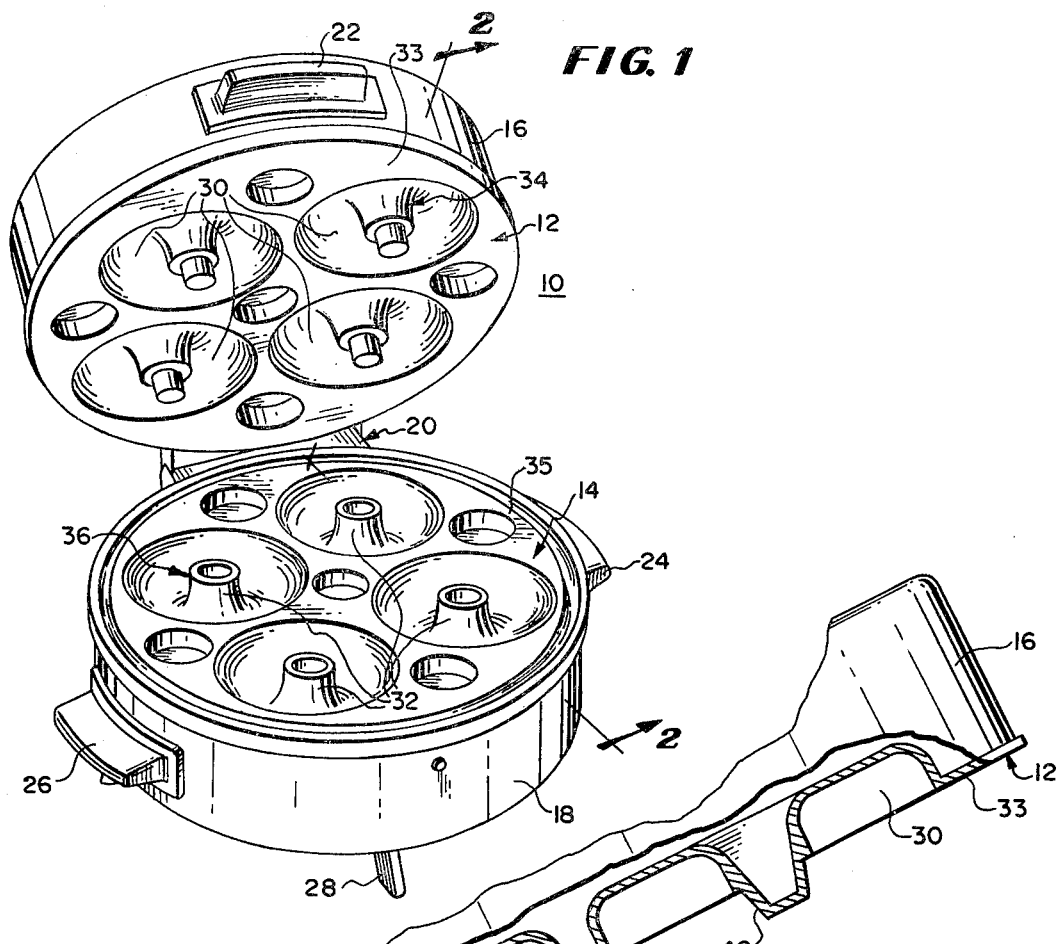
FIG. 1 is a perspective view of an electrical donut making appliance including a cooking oil well and plunger arrangement according to the invention.
Figure 2:
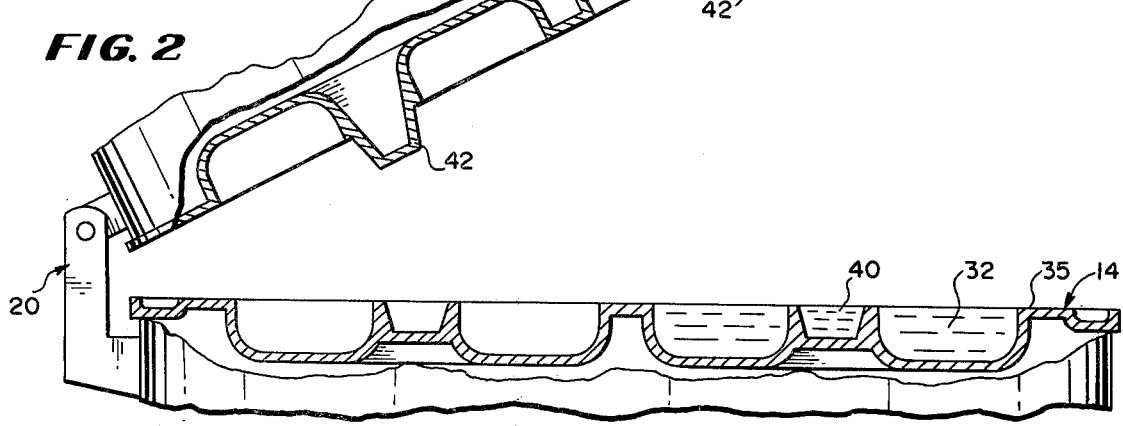
FIG. 2 is a sectional view of the electrical donut making appliance of FIG. 1 taken along the line 2—2 thereof.

Referring now to the drawing in greater detail wherein like numerals have been employed throughout the various views to designate similar components, an electrical donut making appliance according to the invention, designated by the numeral 10, is shown in FIG. 1. The donut making appliance 10 includes upper and lower cast metal grids 12, 14, respectively. The upper grid 12 is mounted in an upper cover portion 16 and the lower grid 14 is mounted in a lower base portion 18 of the appliance. Electrical heating element means (not shown) of the conventional type are included in the cover and base portions for heating respective grids to a predetermined baking temperature. An electrical cord (not shown) is connected to the heating elements for coupling to a source of household current via a standard wall outlet. The cover and base portions are hingedly attached by means of hinge assembly 20 for movement of upper grid 12 into and out of mating engagement with lower grid 14. Upper cover portion 16 includes an insulative handle 22 attached thereto opposite hinge assembly 20. Handle 22 can be grasped by a user when lowering and raising the cover portion. Insulative handles 24, 26 are also provided on the base portion for transporting the appliance. Insulative legs, such as 28, extend from the lower wall of the base portion to support the appliance in spaced relation from a surface on which it is placed.

Each of the upper and lower grids define a plurality of recesses, such as, for example, 30, 32, respectively. The preferred recesses are annular in shape, but can take other shapes if desired. Annular recesses, are popular as they produce donut shaped cakes. The recesses are concave with respect to the planar surfaces 33, 35 of the upper and lower grids, respectively. Central cores such as, 34, 36, respectively, extend outwardly from each of the recesses 30, 32.

Figure 3:
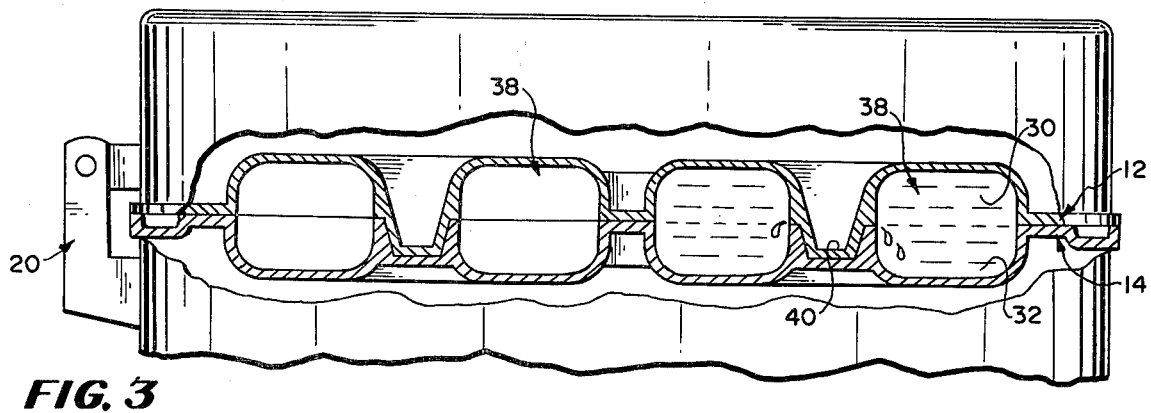
FIG. 3 is a sectional view similar to that of FIG. 2 with the upper and lower grids of the donut making appliance shown in mating engagement.

Lowering cover portion 16 onto base portion 18, causes grids 12, 14 to become engaged along planar surfaces 33, 35, thereof, as shown in FIG. 3. The concave annular recesses 30, 32, are located predeterminedly in respective grids for alignment upon engagement of the grids to form toroidally shaped cavities 38, see FIG. 3, in which batter placed in the recesses 32 of lower grid 14 prior to lowering cover portion 16, is baked into cake-like donuts.

The central core 36 of the lower grid are defined as wells or cavities 40. In the embodiment shown, the wells have the shape of a truncated cone with the end having greatest cross section being open at surface 35 of grid 14. Central cores 34 of the upper grid define plungers 42 which are shaped complementarily to the wells. The plungers extend outwardly from surface 33 of the upper grid for receipt in correspondingly located wells 40 upon lowering cover portion 16 for engagement of grids 12 and 14.

The plunger-well arrangement serves a dual purpose in the donut making appliance according to the invention. In the first place, receipt of plungers 42 of upper grid 12 in wells 40 of the lower grid 14, upon lowering cover portion 16 onto base portion 14, serves to align annular recesses 30 and 32. Secondly, the plunger-well combination serves as a means to effectively coat donut batter placed in the lower recesses 32 with cooking oil prior to baking to provide a finished crust on the resulting donuts. To illustrate the latter, in operation, prior or subsequent to heating grids 12, 14, and placing batter in annular recesses 32, cooking oil is deposited in wells 40 in lower grid 14. Thereafter, cover portion 16 is lowered toward base portion 14 so that the grid surfaces 33, 35, mate. As the grids are brought together, plungers 42 are received in wells 40, aligning recesses 30, 32 and displacing the oil in wells 40 onto the outer surface of the batter (see FIG. 3). Upon engagement of the grids as described, toroidal cavities 38 are formed in which the oil covered batter is baked. The presence of the oil on the batter surface provides a fryed, glazed or frosted crust.

While a particular embodiment of the invention has been shown and described, it should be understood that the invention is not limited thereto since many modifications may be made. It is therefore contemplated to cover by the present application any and all such modifications as fall within the true spirit and scope of the appended claims.

I claim:

1. In a donut maker device including upper and lower grids movable into and out of mating engagement along first surfaces thereof, means for heating said grids to a predetermined temperature, each of said first surfaces of said upper and lower grids defining a recess of a predetermined shape with a central core, the recess of the lower grid having a predetermined depth, the recess of the upper grid being disposed for cooperation with the recess of the lower grid upon bringing the upper and lower grids into mating engagement, thereby to produce a predeterminedly shaped cooking cavity in which batter placed therein is baked to produce a similar shaped cake, the improvement comprising cooking oil dispersion means including plunger means of a predetermined shape provided on the first surface of said upper grid at the central core of said concave recess extending outwardly therefrom and well means defined on the first surface of said lower grid at the central core of said annular recess for receiving cooking oil, said well means being predeterminedly dimensioned to have a depth substantially equal to the depth of the lower grid said well means further being shaped complementarily to said plunger means and positioned for receipt thereof upon bringing the first surfaces of the upper and lower grids into mating engagement, receipt of said plunger means in said well means serving to dispose cooking oil therein onto the batter as well as to align the upper and lower grids.

2. The donut maker device as claimed in claim 1, wherein said recesses have an annular shape and upon bringing said upper and lower grids into mating engagement, provide a toroidally shaped cooking cavity.

3. The donut maker device as claimed in claim 1 wherein said plunger means comprise a depending member tapered from said first surface of said upper grid toward the free end of said plunger means and said well means is of a similar tapered shape, dimensioned for receipt of said depending member.

4. A donut maker device as claimed in claim 3 wherein said depending plunger member has the shape of a truncated cone.

* * * * *